United States Patent [19]

Ikeda

[11] Patent Number: 5,318,338
[45] Date of Patent: Jun. 7, 1994

[54] BODY STRUCTURE FOR AUTOMOTIVE VEHICLE

[75] Inventor: Toshiharu Ikeda, Hiroshima, Japan

[73] Assignee: Mazda Motor Corporation, Hiroshima, Japan

[21] Appl. No.: 917,647

[22] Filed: Jul. 23, 1992

[30] Foreign Application Priority Data

Jul. 25, 1991 [JP] Japan ............... 3-058,690[U]

[51] Int. Cl.$^5$ .............................................. B62D 25/06
[52] U.S. Cl. ...................................... 296/210; 296/203; 296/29
[58] Field of Search ........................... 296/210, 203, 29

[56] References Cited

U.S. PATENT DOCUMENTS

| | | | |
|---|---|---|---|
| 4,775,181 | 10/1988 | Shoda | 296/210 X |
| 4,883,310 | 11/1989 | Miyazaki et al. | 296/210 |
| 5,018,781 | 5/1991 | Kumasaka et al. | 296/210 |

FOREIGN PATENT DOCUMENTS

| | | | |
|---|---|---|---|
| 183359 | 10/1983 | Japan | 296/210 |
| 4081367 | 3/1992 | Japan | 296/210 |

*Primary Examiner*—Joseph D. Pape
*Attorney, Agent, or Firm*—Keck, Mahin & Cate

[57] ABSTRACT

An upper body structure of a vehicle includes a front header extending in a transverse direction of the vehicle. The front header is formed as a generally boxed channel by an upper header frame and a U-channel shaped lower header frame. A side rail extends in a lengthwise direction of the vehicle and has upper and lower rail frames connected so as to form a generally boxed channel. The U-channel shaped lower header frame and the upper rail frame are interconnected by a generally U-channel shaped rigid reinforcement structure.

12 Claims, 3 Drawing Sheets

BODY STRUCTURE FOR AUTOMOTIVE VEHICLE

BACKGROUND OF THE INVENTION

1. Field of the Invention

This invention pertains to part of the body structure of a vehicle and, more particularly, to the upper body structure of a car body by which a connection between a front head panel and roof side rails is reinforced.

2. Description of Related Art

Conventionally, a reinforcement structure is provided so as to reinforce a connection between a front header panel extending in a transverse direction of a vehicle, roof side rails extending in the transverse direction of the vehicle, and front pillars extending downward from the roof side rails. The front header panel and the roof side rail are rigidly connected so as to form a roof frame. Specifically, such a reinforcement structure includes a corner strut member for interconnecting the front header and the roof side rail so as to increase the torsional stiffness of the upper body structure at the connection.

Upper body structures reinforced by such a reinforcement structure are still insufficient in stiffness to withstand crash loads acting on the vehicle body in a vertical direction. In addition to this structural disadvantage, upper body structures reinforced in this manner require the provision, in the vehicle compartment, of a triangular corner section. This is something of a structural disorder that spoils what would otherwise be a "fine" or pleasing interior appearance of the vehicle compartment.

SUMMARY OF THE INVENTION

It is an object of the present invention to provide an upper body structure of a vehicle compartment in a vehicle body which has a fine or pleasing interior appearance.

It is another object of the present invention to provide an upper body structure of a vehicle body which has a sufficient structural stiffness against vertical crash loads acting on the upper body structure.

An upper body structure of a vehicle according to the present invention includes a generally "U-channel" shaped rigid reinforcement structure. The rigid reinforcement structure is used to interconnect a front header, extending in a transverse direction of the vehicle under a front end of the top roof, and a side rail, extending in a lengthwise direction of the vehicle under each side of the top roof. The front header is formed by an upper header frame and a U-channel shaped lower header frame and connected so as to form a generally boxed channel. The side rail is formed by upper and lower rail frames and connected so as to form a generally boxed channel. The front header further includes an extension which is integrally formed with the upper header frame and rigidly connected to the U-channel shaped lower header frame.

According to a specific embodiment of the upper body structure of this invention, the generally U-channel shaped rigid reinforcement structure includes an integral U-channel shaped member. The U-channel shaped member has a bottom wall to which the lower header U-channel shaped frame is rigidly connected and side walls extending from both sides of the bottom wall. The U-channel shaped member is integrally formed with a transitional end wall extending upward from the bottom wall and a top wall extending from an upper end of the transitional end wall to which the upper rail frame is rigidly connected. The generally U-channel shaped rigid reinforcement structure further includes a connecting member for interconnecting the front header and the center pillar.

According to another specific embodiment of the upper body structure, the generally U-channel shaped rigid reinforcement structure includes a connecting member for rigidly interconnecting the upper header frame and the upper rail frame, and an integral extension of the U-channel shaped lower header frame integrally formed with a transitional end wall extending upward from the U-channel shaped lower header frame and rigidly connected to the connecting member.

Such an upper body structure, provided with an extension of the upper header frame and the transitional end wall which function as a pair of "hots" or trusses, reinforces the connection between the front header and the side rail.

BRIEF DESCRIPTION OF THE DRAWINGS

The above and other objects and features of the present invention will be apparent to those skilled in the art from the following description of a preferred embodiment thereof when considered in conjunction with the drawings, in which similar reference numerals have been used to denote the same or similar elements throughout the drawings, and in which.

DETAILED DESCRIPTION OF THE PREFERRED EMBODIMENT

Figure 1:
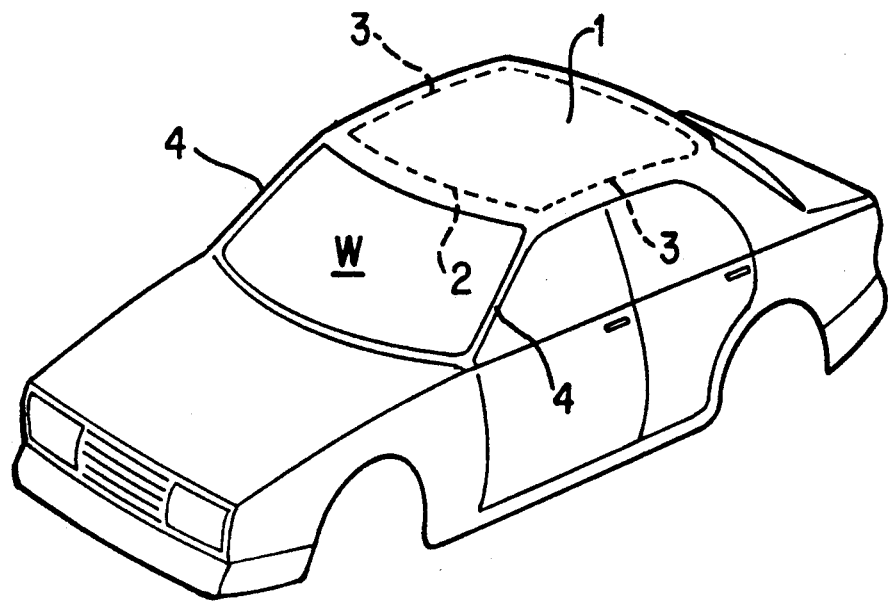
FIG. 1 is a schematic perspective view of a vehicle body, an upper body section of which is structured in accordance with a preferred embodiment of the present invention.

Referring to the drawings in detail and, in particular, to FIG. 1, an upper body section in accordance with a preferred embodiment of the present invention is shown. The upper body section includes a front header frame 2 formed as a generally U-channel, a pair of left and right, roof side rail frames 3 formed as a generally boxed channel, and a pair of, left and right, front pillar frames 4. The front header frame 2 extends in a transverse direction of the car body along a front end of a roof 1. Each roof side rail frame 3 extends in a lengthwise direction of the car body along each side of the roof 1. The roof side rail frame 3 is connected at its front end to an end of the front header frame 2. Each front pillar frame 4 extends downward from the connection. The front header frame 2 and the front pillar frames 4 form part of a frame of a front window W.

Figure 2:
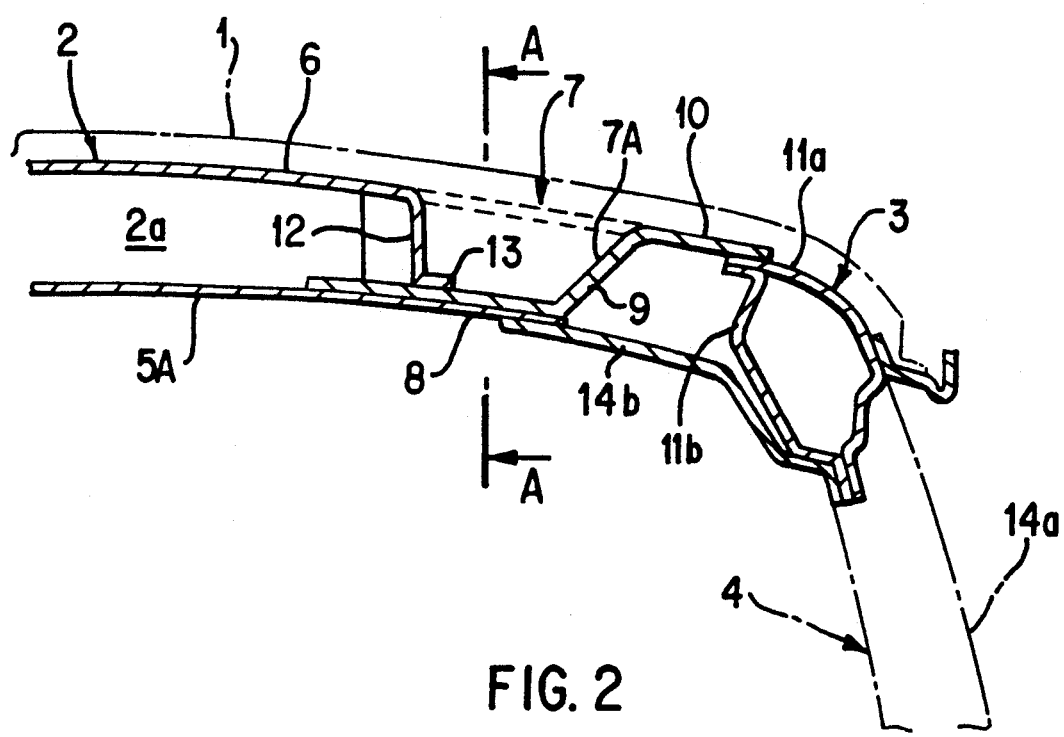
FIG. 2 is a cross-sectional view of the upper body section of the vehicle body in accordance with a preferred embodiment of the present invention.
Figure 3:
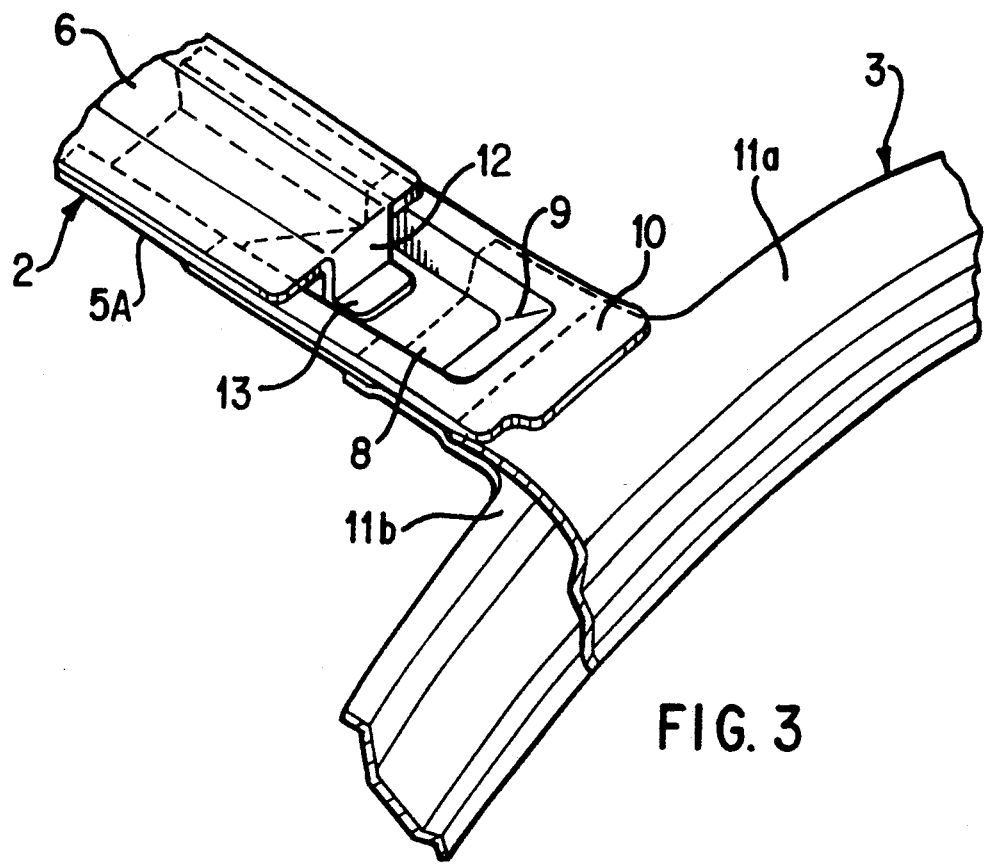
FIG. 3 is a perspective front view showing part of the upper body section of FIG. 2.
Figure 4:
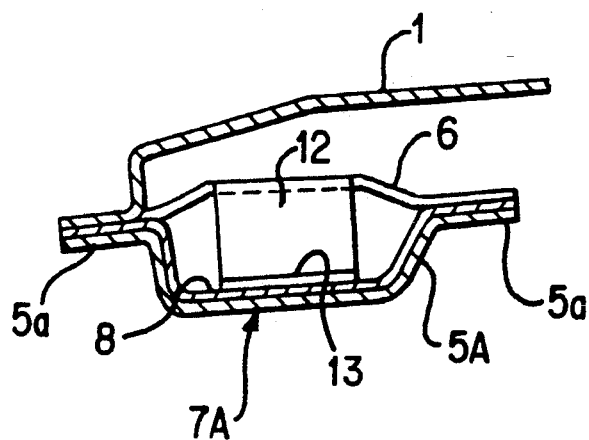
FIG. 4 is a sectional view of FIG. 2 as seen along line A—A.

FIGS. 2 to 4 show details of the upper body section of the vehicle. The front header frame 2 includes a lower header frame portion 5A and an upper header frame portion 6. The lower header frame portion 5A is formed as a generally U-shaped channel with side rims 5a. The front pillar frame 4 includes an outer pillar frame portion 14a and an inner pillar frame portion 14b. The upper header frame portion 6 is welded or otherwise secured to the side rims 5a of the lower header frame portion 5A so as to form a space 2a therebetween. The roof side rail frame 3, having a generally box-shaped cross section, includes an outer rail frame portion 11a and an inner rail frame portion 11b welded or otherwise secured to each other. The front header frame 2 and the roof side rail frame 3 are interconnected by means of a reinforcement structure 7, which includes a reinforcement frame 7A having a generally U-shaped cross section. The reinforcement frame 7A, which is desirably formed as an integral member, includes a bottom wall 8 and a generally U-shaped top wall 10. The end of the bottom wall 8 and the top wall 10 are connected by a side wall 9 extending upward at an appropriate angle. The reinforcement structure 7, thus formed, is disposed between the front header frame 2 and the roof side rail frame 3 with the bottom wall 8 and the top wall 10 welded or otherwise secured to the lower header frame portion 5A of the front header frame 2 and the outer rail frame portion 11a of the roof side rail frame 3, respectively. The upper header frame portion 6 of the front header frame 2 is integrally formed at each end with an end extension 12, extending downward therefrom, at the lower end of which a bend 13 extends outwardly and sideways from the extension 12 and is welded or otherwise secured to the bottom wall 8 of the reinforcement frame portion 7A. The front pillar frame 4 is connected to the front header frame 2 with the inner pillar frame portion 14b welded or otherwise secured to the lower header frame portion 5A.

The side wall 9 of the reinforcement frame 7A and the end extension 12 of the lower header frame portion 5A of the front header frame 2 cooperate in combination as a pair of knots or trusses for the reinforcement structure 7 between the front header frame 2 and the roof side rail frame 3. The reinforcement structure 7 provides sufficient stiffness to the connection between the front header frame 2 and the roof side rail frame 3.

Figure 5:
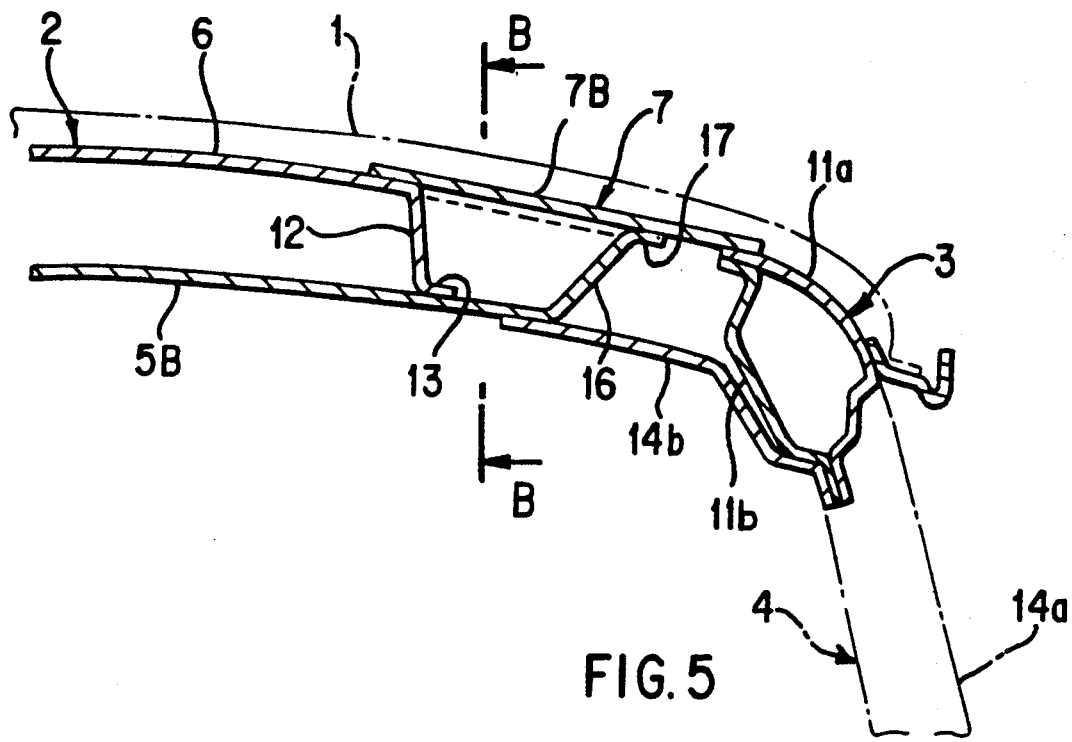
FIG. 5 is a cross-sectional view of the upper body section of the vehicle body in accordance with another preferred embodiment of the present invention.
Figure 6:
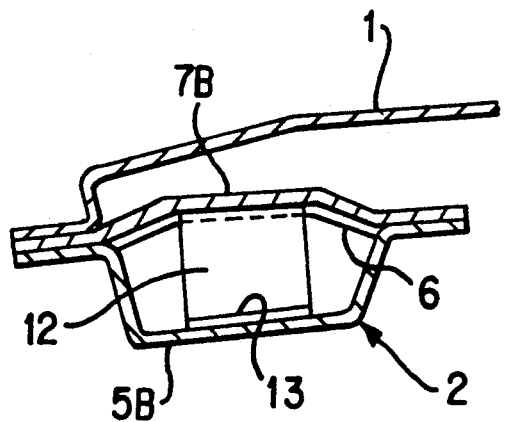
FIG. 6 is a sectional view of FIG. 5 as seen along line B—B.

A pair of knots for the reinforcement structure 7 may be provided by a front header frame 2, as shown in FIGS. 5 and 6.

Referring to FIGS. 5 and 6, the illustrated reinforcement structure 7 includes a reinforcement frame 7B, rigidly connecting an upper header frame portion 6 of a front header frame 2 and an outer rail frame portion 11a of a roof side rail frame 11, an end extension 12 of an upper header frame portion 6 of the front header frame 2, and an end extension 16 of a lower header frame portion 5B. The end extension 16 is integral with the lower header frame portion 5B and extends upward from an end of the lower header frame portion 5B. The upper header frame 2 directly connected to the lower header frame portion 5B with the bend 13 of the end extension 12 welded or otherwise secured to the lower header frame portion 5B. The lower header frame portion 5B is directly connected to the reinforcement frame 7B with a bend 17 of the end extension 16 welded or otherwise secured to the reinforcement frame 7B. The end extensions 12 and 17 of the upper and lower header frame portions 6 and 5B cooperate in combination as a pair of knots or trusses for the reinforcement structure 7 between the front header frame 2 and the roof side rail frame 3.

A reinforcement structure 7 constructed according to the present invention prevents serious deformation or damage of the upper body section between the front header frame 2 and the roof side rail frame 3 even when the upper body section is subjected to external thrust stress or torsional stress upon crashing or overturning of the car. In addition, the reinforcement structure 7 makes it unnecessary to provide a triangular reinforcing structure connecting the front header frame 2 and the roof side rail frame 3. This permits formation of a trim line along an interior corner between the front header frame 2 and the roof side rail frame 3.

It is to be understood that the present invention has been described with respect to a preferred embodiment thereof. Various other embodiments and variants may occur to those skilled in the art. Any such other embodiments and variants which fall within the scope and spirit of the invention are intended to be covered by the following claims.

What is claimed is:

1. An upper body structure of a vehicle including a top roof comprising:

a front header frame extending in a traverse direction of the vehicle under a front end of the top roof, said front header frame having an upper header frame portion and a U-channel shaped lower header frame portion connected together so as to form a channel therebetween;

a side rail extending in a lengthwise direction of the vehicle under each side of the top roof, said side rail having outer and inner rail portions connected so as to form a generally boxed channel; and a generally U-channel shaped rigid reinforcement structure for interconnecting said U-channel shaped lower header frame and the outer rail frame portion, said generally U-channel shaped rigid reinforcement structure comprising a U-channel shaped member having a bottom wall, side walls extending from both sides of said bottom wall, a transitional end wall extending upward from said bottom wall, and a top wall extending from an upper end of said transitional end wall to which the outer rail frame is rigidly connected, said U-channel shaped lower header frame being rigidly connected to an underside of said bottom wall.

2. An upper body structure as defined in claim 1, wherein said front header frame comprises an extension integrally formed with said upper header frame portion and rigidly connected to said bottom wall.

3. Art upper body structure as defined in claim 1, and further comprising a front pillar rigidly connected to said side rail, in a position at which said front header frame is connected, through said generally U-channel shaped-rigid reinforcement structure.

4. An upper body structure as defined in claim 3, wherein said generally U-channel shaped rigid reinforcement structure further comprises a connecting member for interconnecting said front header frame and said front pillar.

5. An upper body structure as defined in claim 4, wherein said connecting member comprises an integral extension of said front pillar.

6. An upper body structure as defined in claim 5, wherein said integral extension of said front pillar is connected to said U-channel shaped lower header frame.

7. An upper body structure of a vehicle including a top roof comprising:
- a front header extending in a transverse direction of the vehicle under a front end of the top roof, said front header having an upper header frame and a U-channel shaped lower header frame connected together so as to form a generally boxed channel;
- a side rail extending in a lengthwise direction of the vehicle under each side of the top roof, said side rail having upper and lower rail frames connected so as to form a generally boxed channel; and
- a generally U-channel shaped rigid reinforcement structure for interconnecting said U-channel shaped lower header frame and the upper rail frame,
- wherein said generally U-channel shaped rigid reinforcement structure comprises a connecting member for rigidly interconnecting said upper header frame and the upper rail frame and an integral extension of said U-channel shaped lower header frame is integrally formed with a transitional end wall extending upward from said U-channel shaped lower header frame and rigidly connected to said connecting member.

8. An upper body structure as defined in claim 7, wherein said front header comprises an extension integrally formed with said upper header frame and rigidly connected to said U-channel shaped lower header frame.

9. An upper body structure as defined in claim 7, and further comprising a front pillar rigidly connected to said side rail in a position at which said front header is connected through said generally U-channel shaped rigid reinforcement structure.

10. An upper body structure as defined in claim 9, wherein said generally U-channel shaped rigid reinforcement structure further comprises a connecting member for interconnecting said front header and said front pillar..

11. An upper body structure as defined in claim 10, wherein said connecting member comprises an integral extension of said front pillar.

12. An upper body structure as defined in claim 11, wherein said integral extension of said front pillar is connected to said U-channel shaped lower header frame.

* * * * *